(12) United States Patent
Chevalier et al.

(10) Patent No.: US 10,896,085 B2
(45) Date of Patent: Jan. 19, 2021

(54) MITIGATING ACTIONS

(71) Applicant: Hewlett-Packard Development Company, L.P., Houston, TX (US)

(72) Inventors: Ronny Chevalier, Boulogne-Billancourt (FR); David Plaquin, Bristol (GB); Guillaume Hiet, Cesson-Sévigné (FR); Adrian Baldwin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 186 days.

(21) Appl. No.: 15/974,625

(22) Filed: May 8, 2018

(65) Prior Publication Data

US 2019/0347155 A1 Nov. 14, 2019

(51) Int. Cl.
| | | |
|---|---|---|
| *G06F 11/07* | (2006.01) | |
| *G06F 11/14* | (2006.01) | |
| *G06F 21/56* | (2013.01) | |
| *H04L 29/06* | (2006.01) | |
| *G06F 21/55* | (2013.01) | |

(52) U.S. Cl.
CPC ...... *G06F 11/0793* (2013.01); *G06F 11/0778* (2013.01); *G06F 11/1471* (2013.01); *G06F 21/554* (2013.01); *G06F 21/56* (2013.01); *H04L 63/20* (2013.01); *G06F 2201/84* (2013.01)

(58) Field of Classification Search
CPC ............ H04L 63/1416; H04L 63/1425; H04L 63/1441; H04L 63/1433; H04L 63/1458; G06F 21/552; G06F 21/554; G06F 21/577; G06F 21/55; G06F 21/56
See application file for complete search history.

(56) References Cited

U.S. PATENT DOCUMENTS

| | | | |
|---|---|---|---|
| 7,784,098 B1 | 8/2010 | Fan et al. | |
| 8,065,725 B2 | 11/2011 | Zheng et al. | |
| 8,103,909 B2 | 1/2012 | Hanna | |
| 8,918,879 B1 | 12/2014 | Li et al. | |
| 8,935,789 B2 | 1/2015 | Shukla | |
| 2002/0178374 A1* | 11/2002 | Swimmer | G06F 21/568 726/24 |
| 2005/0283831 A1* | 12/2005 | Ryu | H04L 63/02 726/11 |
| 2013/0086269 A1* | 4/2013 | Bairavasundaram | G06F 9/5011 709/226 |
| 2014/0101748 A1* | 4/2014 | Ancona | G06F 21/575 726/12 |
| 2016/0179767 A1* | 6/2016 | Mavinakuli | G06F 9/451 715/760 |
| 2016/0269439 A1* | 9/2016 | Ho | H04L 63/0254 |
| 2019/0065322 A1* | 2/2019 | Chakankar | G06F 11/1464 |

* cited by examiner

*Primary Examiner* — Jigar P Patel
(74) *Attorney, Agent, or Firm* — Trop Pruner & Hu PC

(57) ABSTRACT

In an example there is provided a method of applying a mitigation action to a computing system. The method comprises receiving notification of an intrusion event on a computing system. The notification identifies one or more of data, and a process affected by the intrusion event. The method comprises accessing state data corresponding to a state of the computing system prior to the intrusion event, accessing a policy specifying one or more mitigation actions to be applied to the one or more of data, and a process in response to an intrusion event, restoring the one or more of data, and the process on the basis of the state data, and applying a mitigation action according to the policy.

20 Claims, 3 Drawing Sheets

MITIGATING ACTIONS

BACKGROUND

The security of computing platforms is a major concern for users and businesses. Over a long enough time span it is highly likely that intrusions and malware attacks will eventually occur. It is not uncommon for an organization to sustain multiple attacks from a single source. System administrators have to address both the cause of the intrusion as well as preventing the intrusion from reoccurring to the same data and processes. Certain methods and systems provide roll-back mechanisms in the system which allow the system to be returned to a previous safe state. Such methods and systems can be used to temporarily address the damage caused by an intrusion. On the other hand, these systems may not prevent the system from being compromised again in the event that the attack reoccurs.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1:
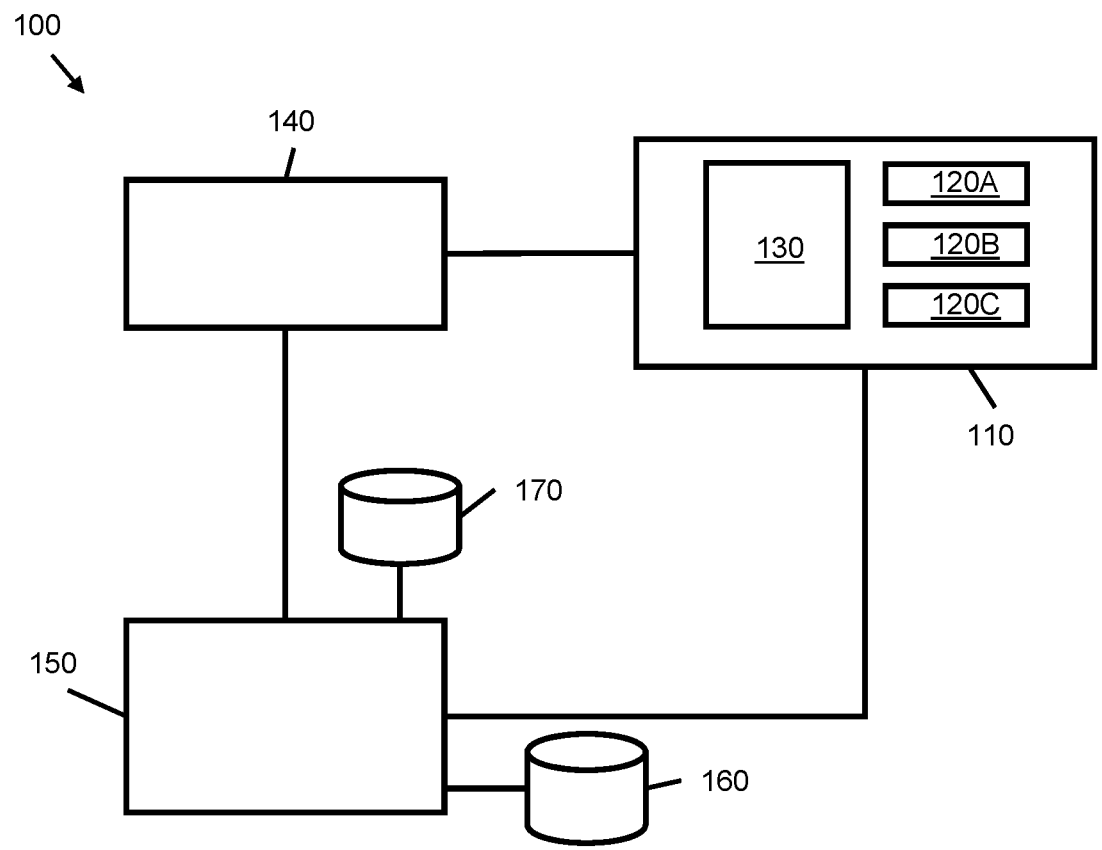
FIG. 1 is a block diagram of a computing system, according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Organizations rely on the security of their computing platforms to operate property and to provide services to their users in an uninterrupted manner. This includes managing security of desktops, laptops, servers, and/or phones. Despite progress in computer security to reduce the likelihood of an intrusion impacting platforms, given enough time, an intrusion will eventually occur with a high probability. Such events may occur due to technical reasons such as a misconfiguration, a system not being updated, or an unknown vulnerability. In other cases, security is compromised as a result of careless mismanagement of data or social engineering.

To limit the damage done by intrusions, intrusion recovery systems help restore a compromised system to a previous safe state. This may help to mitigate some of the damage caused by an initial intrusion event. However, recovering a system to a previous state neither stops the intrusion from reoccurring nor the attackers from achieving a goal such as a data integrity violation. If the recovery system manages to restore the system in to a safe state. Hie system continues to run with the same vulnerabilities and nothing stops attackers re-infecting the system to accomplish their goals. In particular, these recovery systems may create a scenario in which the platform recovers, but then is re-infected almost straight after the recovery.

Methods and systems described herein are designed to withstand ongoing intrusions and to allow business continuity despite the presence of an active adversary i.e. a malicious adversary which will try to repeatedly gain access to systems. In particular, the methods and systems described herein provide intrusion survivability in commodity operating systems and their services. The methods described herein provide both recovery and mitigation in view of the active adversary. The methods and systems are applicable across various well known operating systems including Linux, Windows, Android, iOS or any other UNIX based operating system.

After an intrusion is detected, the system is placed into a degraded mode according to a predefined policy. Some non-essential functions of a service may become unavailable due to a mitigating action being applied. Certain other "core" functions may still be allowed to operate on the system to ensure availability of a service. For example, in the case of a web server hosting a website, a core function of a web server would be to always provide read access to a website. An inessential function of a webserver may include providing support for dynamic content on a website. Once a mitigation action has been applied, an attacker is restricted in their ability to achieve their goats e.g. data theft or data corruption. However, the system can then be patched against potential attacks and then placed back in a normal mode of operation.

Certain methods and systems described herein are implemented in conjunction with an Intrusion Detection Systems (IDS). An IDS can characterize malware and provide notification of intrusions in a system. However, in the context of the present methods, the IDS alone does not provide the same recoverability and survivability mechanisms. This is provided through an additional recovery and mitigation module which may be used in conjunction with an existing IDS. Methods and systems described herein are also used in conjunction with malware detection systems. Certain malware detection systems are configured to identify specific behaviors and notify the system accordingly. One or more malware and intrusion detection systems may be used simultaneously in conjunction with the systems and methods described herein. In particular, the systems are not limited to use with a single IDS.

FIG. 1 shows a computing system 100, according to an example. The computing system 100 is, in certain examples, a server, a desktop computer, an embedded system or portable computing device. An operating system 110 is executed on the computing system 110. The operating system 110 comprises components 120A-120C and a service 130. The operating system 110 may be, for example, a Linux based system. The service 130 is provided through the components 120 and the operating system 110. In examples described herein, the components 120 may correspond to networking, application or hardware interfaces in another case the components 120 correspond to filesystems or other data storage facilities. The service 130 is, for example, a program, application, server, database, database management system, or networking service running in the operating system 110.

According to examples described herein, the service 130 is configurable. A pre-defined set of core requirements are associated to the service 130. These core requirements may be context-dependent. For example, in some circumstances, temporarily disabling the service 130 altogether is appropriate. In other circumstances, it may not be possible to completely disable a service and simultaneously fulfil core requirements. In the example described previously of a web server, it may be the case that it is acceptable to take a website offline temporarily in one context, and still maintain a core functionality of keeping the web server itself running. However, in another context it may not be acceptable to take the website offline without compromising core requirements of the web server.

The operating system 130 is coupled to an intrusion detection system (IDS) 140. The IDS 140 is able to detect intrusions on the operating system 130. Herein an "intrusion" or "intrusion event" refers to, for example, malicious activity, a deliberate violation of a security mechanism or an attempt to gain unauthorized access in the computing system 100. The IDS 140 monitors the operating system 130 for such events. In particular, the IDS 140 is configured to detect and associate intrusion events to specific services such as service 130 in the operating system 110.

In certain examples, the IDS 140 generates information relating to an intrusion event. This information includes characteristics and attributes of the intrusion event. For example, in the case of an intrusion event involving malware, the IDS 140 can record characteristics of the malware using Malware Attribute Enumeration and Characterization (MAEC) and Structured Threat information expression (STIX) standard languages. MAEC is used to encode information about malware attributes, behaviours, artefacts, or attack patterns STIX is used to encode threat information.

In FIG. 1, the IDS 140 is communicatively coupled to a recovery and mitigation module 150. The IDS 140 is arranged to notify the recovery and mitigation module 150 that an intrusion event has occurred. The IDS 140 generates a notification using, (or example, MAEC and STIX and communicates the notification to the recovery and mitigation module 150. The recovery and mitigation module 150 is arranged to execute the recovery of processes and data following the intrusion event.

Once the recovery and mitigation module 150 receives the notification from the IDS 140, it performs the recovery and mitigation actions as soon as possible. This ensures that the core functions of the computing system 100 are maintained.

The methods and systems described herein maintain core functions, mitigate the threat of an intrusion, and restore affected data and processes. This is achieved using an orchestration of recovery and mitigations actions. The recovery action restores the state of processes and data associated to the affected service to a previous known safe state. A mitigation action removes privileges, isolates components or modifies resource quotas of the system from the service according to the information provided by the IDS 140. Such mitigation either stops the service from being re-infected or stops attackers from achieving their goats e.g. data theft or data integrity violation. After a mitigation is applied, however, not only the attackers but the service is restricted in its capacity. It effectively puts the system m a degraded mode, because some functions are not available anymore. In certain examples described herein mitigation actions are applied on a per-service basis. For example, if a service is given access to a USB device, a mitigation action may comprise removing access to the USB device for that service. However, other services that make use of the USB device will still have access to the USB device, unless a further mitigation action were applied to remove that access.

In order to perform recovery actions, "snapshots" of the filesystem and the services during the normal operation of the OS are stored in a state data storage container 160. The state data storage 160 is communicatively coupled to the recovery a mitigation module 150. The state data comprise states of the operating system 110 at particular time points. This includes the states of processes and data stored in memory of the operating system 110 that are associated to a service that is being recovered, in one case, the state data storage 160 is periodically updated by taking a snapshot of the operating system. In certain examples, the state data storage 160 is configured to maintain a log of the data which has been modified from the previous snapshot.

According to examples described herein, the state data storage 180 is implemented using Checkpoint/Restore in Userspace (CRIU) on the Linux operating system. This is used in conjunction with Snapper for Linux (www.snapper.io). Periodic atomic snapshots of a monitored service including all associated processes and service metadata are performed by freezing the processes of the monitored service e.g. by removing the processes from a scheduling queue during the checkpointing procedure. Freezing the process associated to a monitored service ensures there are no inconsistencies in the state data.

Following notification from the IDS 140 that an intrusion event has occurred, the recovery and mitigation module 150 is arranged to access state data from the state data storage 160. The state data corresponds to a state of the operating system 110 prior to the intrusion event. The recovery and mitigation module 150 is arranged to restore the operating system 110 on the basis of the state data. This may include restoring the data which has been modified between the two snapshots of the operating system 110.

In order to apply mitigation actions, the recovery and mitigation module 150 is further coupled to a policy management module 170. The policy management module 170 stores policies relating to processes and data on the operating system 110. Each policy describes a set of mitigation actions that the recovery and mitigation module 150 applies to processes and data associated to a service which has come under attack. For example, in certain cases malware utilises write access to particular processes to disrupt a service. Thus, a policy can specify a mitigation action which removes the write access to a particular process or set of processes in the event that a service which relies on those processes comes under attack. On the other hand, a policy may still allow read access to certain data to allow the system to function with a reduced capability, but still retain core functionality. The policies are therefore also used to maintain the availability of core functions of service, where the alternative of disabling the service completely is undesirable.

As previously described, in certain circumstances the core functions of a service may vary. Consequently, the policy describing the types of mitigation actions that may be applied by the recovery and mitigation module 150 in response to an attack may also vary depending on the context. For example, the policy may vary depending on the platform on which the operating system 130 is implemented. A server, a desktop, or an embedded system have different constraints due to the different functions they provide. Hence, some mitigations actions are avoided due to their availability cost. In particular there is a trade-off between the cost to lose the availability of a function in a service and the security risk on the system due to an intrusion event.

Figure 2:
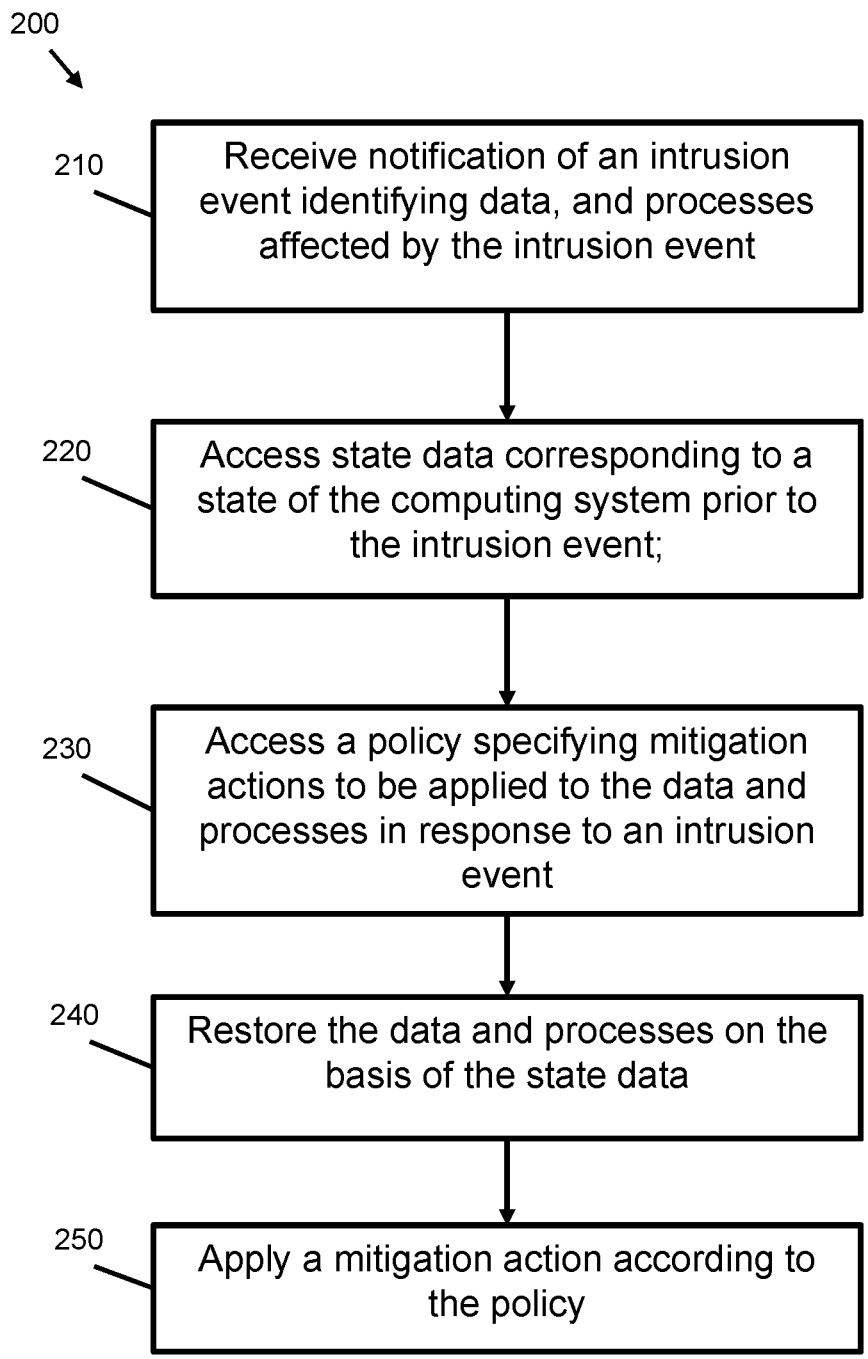
FIG. 2 is a diagram showing a flow chart for applying restoring data and processes on a computing system, according to an example.

FIG. 2 is a flow diagram showing a method 200 of performing recovery and mitigation actions according to an example. The method 200 may be implemented on the computing system 100 shown in FIG. 1. At block 210 a notification identifying processes and data affected by an intrusion event is received. The notification may be communicated by the IDS 140 shown in FIG. 1.

At block 220, state data corresponding to a state of the computing system prior to the intrusion event is accessed. This is implemented, for example, by the recovery and mitigation module 150 shown in FIG. 1. According to an example, the method 200 comprises determining one or more snapshots of the state data of the computing system and storing the snapshot. In one example, accessing the state data comprises accessing a snapshot of the system state prior to the intrusion event. In one case, the snapshots of the computing system are taken periodically. In a further example, determining a snapshot comprises maintaining a log of the data which has been modified from the previous snapshot, and storing the modified data. A log may be stored and maintained in state data storage as described in relation to FIG. 1.

At block 230, a policy specifying mitigation actions to be applied to the data and processes in response to an intrusion event, is accessed. When the method 200 is implemented on the system 100 shown in FIG. 1, accessing the policy is executed by the recovery and mitigation module 150. According to an example, the policy comprises one or more constraints to be applied to the one or more of data, and a process in response to an intrusion event. In some examples, the constraints comprise at least one of: privilege de-escalation, isolation of components in the computing system or modification of resources quotas m the computing system. Privilege de-escalation comprises removing the read and/or write access in certain processes or to sectors of memory. Modifying a resource quota comprises limiting CPU usage or RAM consumption of a process. According to a further example, the policy comprises instructions to ensure maintenance of core functionalities of a process in response to notification of an intrusion event.

At block 240, the data and processes are restored on the basis of the state data. This is implemented by the recovery and mitigation module 150. In one case, the data and processes are restored from a snapshot of the computing system stored in state data storage, the snapshot having been determined at a time before the intrusion event when the computing system was m a known, safe state.

At block 250, a mitigation action is applied according to a policy. The application of a mitigation action is implemented by the recovery and mitigation module 150. In certain cases, applying a mitigation action comprises determining one or more characteristics of the intrusion event, and determining, based on the policy and characteristics of the intrusion event, an appropriate mitigation action to apply.

According to an example, the method 200 shown in FIG. 2 further comprises: receiving notification of a further intrusion event, accessing the updated policy, restoring the one or more of data, and a process on the basis of the state data and applying a mitigation action according to the updated policy.

In some cases, the method 200 further comprises reversing a mitigation action. In particular, at a later point in time, once a process or data has been patched to prevent repeat intrusion events, it may no longer be necessary to apply a mitigation action to the previously affected processes or data. The recovery and mitigation module 150 is therefore able to reverse such a mitigation action.

The methods and systems described herein prevent computing systems being compromised repeatedly in the event of reoccurring intrusion events. In contrast to systems which merely address recoverability following an intrusion event, the present methods and systems further prevent re-infection. In particular, the present methods and systems are more resilient and provide improved continuity following an intrusion event. Advantageously, the methods and systems described herein give greater security in the presence of an active adversary.

Examples in the present disclosure can be provided as methods, systems or machine-readable instructions, such as any combination of software, hardware, firmware or the like. Such machine-readable instructions may be included on a computer readable storage medium (including but not limited to disc storage, CO-ROM, optical storage, eta) having computer readable program codes therein or thereon.

The present disclosure is described with reference to flow charts and/or block diagrams of the method, devices and systems according to examples of the present disclosure. Although the flow diagram described above shows a specific order of execution, the order of execution may differ from that which is depicted. Blocks described in relation to one flow chart may be combined with those of another flow chart. In some examples, some blocks of the Row diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASiC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
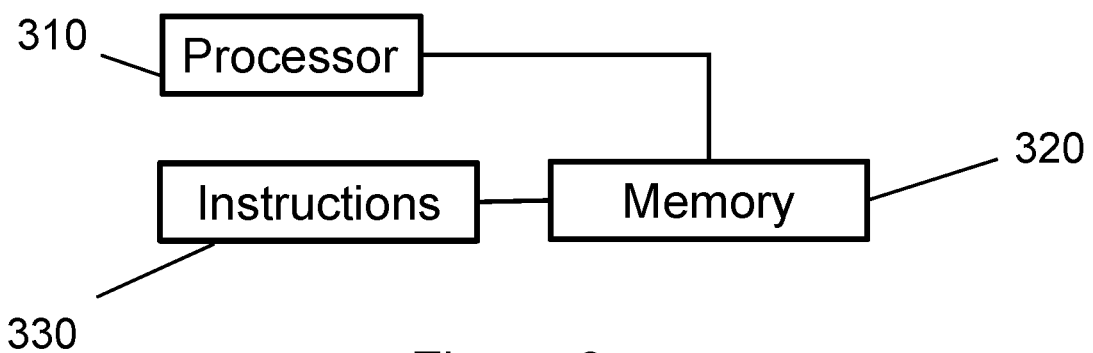
FIG. 3 shows a processor associated with a memory and comprising instructions for providing a recovery and mitigation system according to an example.

FIG. 3 shows an example of a processor 310 associated with a memory 320. The memory 320 comprises computer readable instructions 330 which are executable by the processor 310. The instructions 330 comprise instruction to: receive notification of an intrusion event on a computing system, the notification identifying one or more of data, and a process affected by the intrusion event; access state data corresponding to a state of the computing system prior to the intrusion event, access a policy specifying one or more mitigation actions to be applied to the one or more of data, and a process in response to an intrusion event; restore the one or more of data, and a process on the basis of the state data; and apply a mitigation action according to the policy.

Such machine-read able instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited m the claims.

The features of any dependent claim may be combined with the features of any of the independent claims or other dependent claims.

The invention claimed is:

1. A method performed by a computing system comprising a hardware processor, comprising:
   receiving a notification of an intrusion event at the computing system, the notification identifying a service affected by the intrusion event;
   accessing state data corresponding to a state of the computing system prior to the intrusion event;
   determining a context of the computing system;
   selecting, based on the determined context, a first policy from a plurality of policies, the first policy specifying a first mitigation action to apply in the computing system in response to the intrusion event, wherein the plurality of policies correspond to respective different contexts and specify application of different mitigation actions for the intrusion event;
   applying the first mitigation action according to the first policy, wherein the first mitigation action comprises maintaining a first function of the service while disabling a second function of the service, wherein the maintaining and the disabling cause the service to operate in a degraded mode where the first function is available and the second function is not available; and
   restoring the computing system based on the state data.

2. The method of claim 1, wherein the first policy comprises a constraint to be applied to the service in response to the intrusion event, and wherein the constraint applied comprises limiting usage of a central processing unit (CPU) or a random access memory (RAM).

3. The method of claim 1, wherein the context is based on a type of platform of the computing system.

4. The method of claim 1, wherein the first policy comprises instructions to maintain the first function in response to the intrusion event, and instructions to disable the second function in response to the intrusion event.

5. The method of claim 1, comprising:
   updating the first policy to specify a further mitigation action to be applied in response to a further intrusion event;
   receiving a notification of the further intrusion event;
   accessing the updated first policy; and
   applying the further mitigation action according to the updated first policy.

6. The method of claim 3, wherein a first context of the different contexts comprises a first type of platform of the computing system, and a second context of the different contexts comprises a second type of platform of the computing system, and
   wherein the first mitigation action specified by the first policy corresponding to the first context for the intrusion event is different from a second mitigation action specified by a second policy corresponding to the second context for the intrusion event.

7. The method of claim 1, comprising:
   determining a snapshot of the state data of the computing system; and
   storing the snapshot.

8. The method of claim 7, wherein the accessing of the state data corresponding to the state of the computing system prior to the intrusion event comprises accessing the snapshot.

9. The method of claim 7, wherein the determining of the snapshot comprises maintaining a log of the state data that has been modified from a previous snapshot.

10. The method of claim 1, wherein the applying of the first mitigation action comprises:
    determining a characteristic of the intrusion event; and
    determining, based on the first policy and the characteristic of the intrusion event, the first mitigation action to apply.

11. The method of claim 1, further comprising:
    reversing the first mitigation action in response to the service being patched to prevent a further intrusion event.

12. The method of claim 1, wherein the first function is a read access of data of the computing system, and the disabled second function is a write access of the data of the computing system.

13. The method of claim 1, wherein the disabled second function is an access of a Universal Serial Bus (USB) device.

14. The method of claim 6, wherein the first type of platform of the computing system comprises one of a server computer, a desktop computer, and an embedded system, and the second type of platform of the computing system comprises a different one of the server computer, the desktop computer, and the embedded system.

15. A recovery system for a computing device, comprising:
    a storage medium to store state data of the computing device; and
    a processor to execute instructions to:
       receive a notification of an intrusion event on the computing device;
       access the state data from the storage medium, wherein the accessed state data corresponds to a state of the computing device prior to the intrusion event;
       determine a context of the computing device;
       select, based on the determined context, a first policy from a plurality of policies, the first policy specifying a first mitigation action to apply in the computing device in response to the intrusion event, wherein the plurality of policies correspond to respective different contexts and specify application of different mitigation actions for the intrusion event;
       apply the first mitigation action in response to the intrusion event, wherein the first mitigation action comprises maintaining a first function of a service affected by the intrusion event while disabling a second function of the service, wherein the maintaining and the disabling are to cause the service to operate, in the computing device, in a degraded mode where the first function is available and the second function is not available; and restore the computing device based on the state data.

16. The recovery system of claim 15, wherein the context is based on a type of platform of the computing device, a first context of the different contexts comprises a first type of platform of the computing device, and a second context of the different contexts comprises a second type of platform of the computing device, and wherein the first mitigation action specified by the first policy corresponding to the first context for the intrusion event is different from a second mitigation action specified by a second policy corresponding to the second context for the intrusion event.

17. The recovery system of claim 15, wherein the first function is a read access of data of the computing device, and the disabled second function is a write access of the data of the computing device.

18. The recovery system of claim 15, wherein the disabled second function is an access of a Universal Serial Bus (USB) device.

19. A non-transitory machine-readable storage medium comprising instructions that upon execution cause a system to:

receive a notification of an intrusion event in a computing device, the notification identifying a service affected by the intrusion event;

access state data corresponding to a state of the computing device prior to the intrusion event;

determine a context of the computing device;

select, based on the determined context, a first policy from a plurality of policies, the first policy specifying a first mitigation action to apply to the service in response to the intrusion event, wherein the plurality of policies correspond to respective different contexts and specify application of different mitigation actions for the intrusion event;

apply the first mitigation action according to the first policy, wherein the first mitigation action comprises maintaining a first function of the service while disabling a second function of the service, wherein the maintaining and the disabling cause the service to operate in a degraded mode where the first function is available and the second function is not available; and restore the computing device based on the state data.

20. The non-transitory machine-readable storage medium of claim 19, wherein the context is based on a type of platform of the computing device, a first context of the different contexts comprises a first type of platform of the computing device, and a second context of the different contexts comprises a second type of platform of the computing device, and wherein the first mitigation action specified by the first policy corresponding to the first context for the intrusion event is different from a second mitigation action specified by a second policy corresponding to the second context for the intrusion event.

* * * * *